(12) United States Patent
Du et al.

(10) Patent No.: US 11,658,752 B1
(45) Date of Patent: May 23, 2023

(54) NODE POSITIONING METHOD FOR UNDERWATER WIRELESS SENSOR NETWORK (UWSN) BASED ON ZEROING NEURAL DYNAMICS (ZND)

(71) Applicant: Qinghai Normal University, Xining (CN)

(72) Inventors: Xiujuan Du, Xining (CN); Lijuan Wang, Xining (CN)

(73) Assignee: Qinghai Normal University, Xining (CN)

( * ) Notice: Subject to any disclaimer, the term of this patent is extended or adjusted under 35 U.S.C. 154(b) by 0 days.

(21) Appl. No.: 17/941,254

(22) Filed: Sep. 9, 2022

(30) Foreign Application Priority Data

Jan. 21, 2022 (CN) .......................... 202210073553.4

(51) Int. Cl.
*H04B 13/02* (2006.01)
*H04W 84/18* (2009.01)
*H04B 7/00* (2006.01)

(52) U.S. Cl.
CPC ............... *H04B 13/02* (2013.01); *H04B 7/00* (2013.01); *H04W 84/18* (2013.01)

(58) Field of Classification Search
CPC .......... H04B 13/02; H04B 7/00; H04W 84/18
See application file for complete search history.

(56) References Cited

U.S. PATENT DOCUMENTS

| | | | |
|---|---|---|---|
| 11,218,886 B2 * | 1/2022 | Tomic | .................. G01S 5/0289 |
| 2009/0099474 A1 | 4/2009 | Pineda | |
| 2018/0132064 A1 | 5/2018 | Sark et al. | |
| 2020/0278423 A1 | 9/2020 | Rittberg et al. | |

FOREIGN PATENT DOCUMENTS

| | | | | |
|---|---|---|---|---|
| CN | 102711247 A | 10/2012 | | |
| CN | 106093849 A | * 11/2016 | ............... | G01S 5/00 |
| CN | 106093849 A | 11/2016 | | |
| CN | 106501774 A | 3/2017 | | |
| CN | 106549696 A | * 3/2017 | ............. | H04B 13/02 |
| CN | 107907854 A | 4/2018 | | |

(Continued)

OTHER PUBLICATIONS

Han et al, "A Target Tracking Method Based on Underwater Mobile Wireless Sensor Network", translation CN 111082878, Apr. 28, 2020.*

(Continued)

*Primary Examiner* — Khaled M Kassim
*Assistant Examiner* — Kai Chang

(57) ABSTRACT

This application relates to underwater wireless sensor networks, and more particularly to a node positioning method for an underwater wireless sensor network (UWSN) based on zeroing neural dynamics (ZND), including: (S1) defining a time-varying problem of node positioning of the UWSN based on an angle of arrival (AOA) algorithm and a time difference of arrival (TDOA) algorithm; (S2) performing modeling for the time-varying problem to acquire a mathematical model of a linear dynamic matrix equation; (S3) establishing a modified zeroing neural dynamics (MZND) model with a nonlinear activation function; and (S4) solving the time-varying problem by utilizing the MZND model to complete the node positioning of the UWSN.

3 Claims, 5 Drawing Sheets

(56) References Cited

FOREIGN PATENT DOCUMENTS

| | | | | |
|---|---|---|---|---|
| CN | 110174690 A | | 8/2019 | |
| CN | 110913452 A | | 3/2020 | |
| CN | 111082878 A | * | 4/2020 | ............ H04B 13/02 |
| CN | 111652246 A | | 9/2020 | |
| CN | 113099383 A | * | 7/2021 | |
| CN | 110913404 B | * | 5/2022 | ............ H04W 16/20 |
| WO | 2004108524 A2 | | 12/2004 | |

OTHER PUBLICATIONS

Jin et al, "A Directional Acoustic Network Power Control Method", translation CN 106549696, Mar. 29, 2017.*

Feng et al, "UWSNs Node Locating Method Based on Node Mobile Mobile Prediction", translation CN 110913404, May 31, 2022.*

Hao et al, "An AUV-assisted Three-dimensional Underwater Node Self-positioning Method", translation CN 113099383, Jul. 9, 2021.*

Dong et al, "An Underwater Location Method Based On Ranging And Neural Network Algorithm", translation CN 106093849, Nov. 9, 2016.*

Shuqiao Wanga et al., "Accelerated convergent zeroing neurodynamics models for solving multi-linear systems with M-tensors", <<ELSEVIER>>, vol. 458, Oct. 11, 2021, pp. 271-283, College of Computer, Key Laboratory of the Internet of Things of Qinghai Province, Qinghai Normal University, Xining 810008, China.

Shuai Li et al., "Nonlinearly Activated Neural Network for Solving Time-Varying Complex Sylvester Equation", <<IEEE Transactions on Cybernetics>>, 44(8), pp. 1397-1407, Aug. 2014.

Peter A. Sandborn: "The Forecasting and Impact of the Loss of Critical Human Skills Necessary for Supporting Legacy Systems", <<IEEE Transactions on Engineering Management>>, 62(3), pp. 361-371, Aug. 2015.

Caiwei Wang et al., "Research on Fixed-Point Neural Network Algorithm for Node Localization in Underwater Wireless Sensor Networks", <<Information Technology and Informatization>>, pp. 237-239.

Bing Wang al et.,"A Method of Selecting Optimal Localization Beacons for Mobile Robots" <<Machine Design and Research>>, Issue 2, 2000 13-16, Shanghai Jiao Tong University, Shanghai, China.

* cited by examiner

NODE POSITIONING METHOD FOR UNDERWATER WIRELESS SENSOR NETWORK (UWSN) BASED ON ZEROING NEURAL DYNAMICS (ZND)

CROSS-REFERENCE TO RELATED APPLICATIONS

This application claims the benefit of priorities from Chinese Patent Application No. 202210073553.4, filed on Jan. 21, 2022. The content of the aforementioned application, including any intervening amendments thereto, is incorporated herein by reference.

TECHNICAL FIELD

This application relates to underwater wireless sensor networks (UWSNs), and more particularly to a node positioning method for an underwater wireless sensor network based on zeroing neural dynamics (ZND).

BACKGROUND

Underwater wireless sensor network (UWSN) has been gradually applied to the large-scale marine monitoring. For marine resource development, marine calamity forecast, and national ocean military, it is necessary for the UWSN to provide accurate spatio-temporal data. In addition, the operation of many UWSN technologies (i.e., media access control (MAC) mechanisms, routing forwarding, and topology control) relies on node location information. Therefore, the improvement of the positioning technology should be prioritized. However, the dynamic underwater environment and the autonomous motion of the node cause the node location to change over time, and thus the UWSN node positioning problem actually becomes a time-varying problem. How to realize the modeling of the time-varying positioning problem and fast and accurately solve the model has attracted extensive attention.

Currently, the UWSN node positioning is performed mainly by range-based and range-free algorithms. Regarding the range-based method, the distance between nodes is obtained through geometric measurement, and then the positioning is realized by triangulation or trilateration. While in the range-free method, the positioning is achieved based on node connectivity. The parameters involved in the geometric measurement include angle of arrival (AOA), time of arrival (TOA), time difference of arrival (TDOA), and received signal strength (RSS). Some nodes whose location information is known are referred to as anchor nodes. Other nodes, whose locations are unknown and need to be determined by geometric measurement in conjunction with coordinates of the anchor nodes, are referred to as unknown nodes. At present, the node positioning is addressed in a static manner, and the time-varying characteristics of the positioning problem in real conditions are not considered.

SUMMARY

An object of this disclosure is to provide a node positioning method for underwater wireless sensor networks (UWSNs) based on zeroing neural dynamics (ZND), which can realize the fast and accurate positioning of unknown nodes.

The technical solutions of the disclosure are described below.

This application provides a node positioning method for an UWSN based on ZND, comprising:

(S1) defining a time-varying problem of node positioning in the UWSN based on an angle of arrival (AOA) algorithm and a time difference of arrival (TDOA) algorithm;

(S2) performing modeling for the time-varying problem of the node positioning in the UWSN to acquire a mathematical model of a linear dynamic matrix equation;

(S3) establishing a modified zeroing neural dynamics (MZND) model with a nonlinear activation function; and (S4) solving the time-varying problem of the node positioning in the UWSN by utilizing the MZND model to complete node positioning of the UWSN.

In an embodiment, in the AOA algorithm, a position coordinate of an unknown node is obtained by an AOA of a communication signal at a receiving node, wherein the receiving node is an anchor node; consider a two-dimensional (2D) scenario where the position coordinate of the unknown node changes over time, and m anchor nodes are randomly arranged and have a fixed location, coordinates H of the m anchor nodes and position coordinate h(t) of the unknown node are respectively defined as follows:

$$H = \begin{bmatrix} x_1 & x_2 & \cdots & x_m \\ y_1 & y_2 & \cdots & y_m \end{bmatrix} \in \mathbb{R}^{2\times m}, \; h(t) = \begin{bmatrix} x(t) \\ y(t) \end{bmatrix} \in \mathbb{R}^2;$$

according to a geometric meaning of the AOA, at any same moment, a tangent (tan) value of an AOA of each of the m anchor nodes and the unknown node is represented as:

$$\tan(\alpha_i(t)) = \frac{y(t) - y_i}{x(t) - x_i}; \quad (1)$$

wherein $i \in \{1, 2, \ldots, m\}$; $\alpha_i(t)$ denotes an arrival angle of a communication signal between the unknown node and an $i^{th}$ anchor node at moment t; and formula (1) is transformed into:

$$-\tan(\alpha_i(t))x(t)+y(t)=y_i-\tan(\alpha_i(t)); \text{ and}$$

the time-varying problem of the node positioning in the UWSN based on the AOA in the 2D scenario is defined as:

$$\begin{bmatrix} -\tan(\alpha_1(t)) & 1 \\ -\tan(\alpha_2(t)) & 1 \\ \vdots & \vdots \\ -\tan(\alpha_m(t)) & 1 \end{bmatrix} \begin{bmatrix} x(t) \\ y(t) \end{bmatrix} = \begin{bmatrix} y_1 - x_1\tan(\alpha_1(t)) \\ y_2 - x_2\tan(\alpha_2(t)) \\ \vdots \\ y_m - x_m\tan(\alpha_m(t)) \end{bmatrix}. \quad (2)$$

In an embodiment, the TDOA algorithm is configured to measure time differences of communication signals originated from a source to the m anchor nodes to estimate the position coordinate of the unknown node; a 3D mobile scenario is observed, wherein coordinates N of the m anchor nodes and position coordinate n(t) of the unknown node are respectively defined as follows:

$$N = \begin{bmatrix} x_1 & x_2 & \cdots & x_m \\ y_1 & y_2 & \cdots & y_m \\ z_1 & z_2 & \cdots & z_m \end{bmatrix} \in \mathbb{R}^{3\times m}, \; n(t) = \begin{bmatrix} x(t) \\ y(t) \\ z(t) \end{bmatrix} \in \mathbb{R}^3;$$

according to physical meaning of TDOA, the following formulas are obtained:

$$r_i(t) = vT_i(t) = \sqrt{(x_i-x(t))^2+(y_i-y(t))^2+(z_i-z(t))^2};$$

$$\Delta T_{i1}(t)=T_i(t)-T_1(t); \text{ and}$$

$$r_{i1}(t)=v\Delta T_{i1}(t)=r_i(t)-r_1(t);$$

wherein $i \in \{1, 2, \ldots, m\}$; v represents a transmission velocity of the communication signal in a media; $T_i(t)$ represents time spent in transmitting the communication signal from the unknown node to the $i^{th}$ anchor node; $\Delta T_{i1}(t)$ represents different between $T_i(t)$ and time spent in transmitting the communication signal from the unknown node to a $1^{st}$ anchor node; $r_i(t)$ represents a distance between the unknown node and the $i^{th}$ anchor node; $r_{i1}(t)$ represents different between $r_i(t)$ and a distance between the unknown node and the $1^{st}$ anchor node; and by derivation, the time-varying problem of the node positioning in the UWSN based on the TDOA in the 3D mobile scenario is defined as:

$$\begin{bmatrix} x_{21} & y_{21} & z_{21} & v\Delta T_{21}(t) \\ x_{31} & y_{31} & z_{31} & v\Delta T_{31}(t) \\ \vdots & \vdots & \vdots & \vdots \\ x_{m1} & y_{m1} & z_{m1} & v\Delta T_{m1}(t) \end{bmatrix} \begin{bmatrix} x(t) \\ y(t) \\ z(t) \\ r_1(t) \end{bmatrix} = \begin{bmatrix} (Q_2-Q_1-(v\Delta T_{21}(t))^2)/2 \\ (Q_3-Q_1-(v\Delta T_{31}(t))^2)/2 \\ \vdots \\ (Q_m-Q_1-(v\Delta T_{m1}(t))^2)/2 \end{bmatrix}. \quad (3)$$

In an embodiment, in step (S2), based on formulas (2) and (3), the mathematical model of the linear dynamic matrix equation is expressed as follows:

$$P(t)s(t)=z(t) \quad (4);$$

wherein $P(t) \in \mathbb{R}^{p \times q}$ is a known coefficient matrix and involves AOA and TDOA of the communication signal; $z(t) \in \mathbb{R}^p$ is a known vector; and $s(t) \in \mathbb{R}^q$ is an unknown vector and involves a position of the unknown node to be determined. In an embodiment, in step (S3), the MZND model is constructed through steps of:

(S31) defining an error function, expressed as:

$$e(t)=P(t)s(t)-z(t) \in \mathbb{R}^p;$$

(S32) defining an evolution equation, expressed as:

$$\dot{e}(t)=-\varphi L(e(t)) \quad (5);$$

wherein $\varphi$ is a positive value, and is configured to control a convergence rate of a neural dynamic model; $L(\cdot): \mathbb{R}^p \to \mathbb{R}^p$ represents a monotonically increasing odd function group, and each element in the odd function group is represented as $\iota(\cdot): \mathbb{R} \to \mathbb{R}$, wherein $\iota(\cdot)$ is configured to make each item of the error function converge to zero within a finite period;

(S33) obtaining the neural dynamics model for solving the time-varying problem of the node positioning in the UWSN under a positive definite situation by using formula (5), shown as:

$$\dot{s}(t)=P^+(t)[\dot{z}(t)-\dot{P}(t)s(t)-\varphi L(P(t)s(t)-z(t))] \quad (6);$$

wherein $P^+(t)$ represents an inverse matrix of the matrix $P(t)$; as for an overdetermined situation, p>q, the error function is substituted into the formula (5), and both sides of the formula (5) are multiplied by $P^T(t)$ to obtain formula (7):

$$P^T(t)P(t)\dot{s}(t)=\varphi P^T(t)L(P(t)s(t)-z(t))-P^T(t)\dot{P}(t)s(t)+P^T(t)\dot{z}(t) \quad (7);$$

if $P(t)$ is full-rank, $P^+(t)P(t)$ is invertible and $P^+(t)=(P^T(t)P(t))^{-1}P^T(t)$; and formula (7) is rewritten into formula (8) for unifiedly representing the neural dynamics model for solving the time-varying problem of the node positioning in the UWSN, expressed as:

$$\dot{s}(t)=P^+(t)[\dot{z}(t)-\dot{P}(t)s(t)-\varphi L(P(t)s(t)-z(t))] \quad (8);$$

(S34) designing an nonlinear activation function, shown as:

$$\iota(x)=\kappa_1|x|^\tau \text{sgn}(x)+\kappa_2|x|^\Gamma \text{sgn}(x) \quad (9);$$

wherein $\|$ represents an absolute value of a scalar; $\kappa_1$ and $\kappa_2$ are scaling factors, and $\kappa_1, \kappa_2>0$; $\tau$ and $\sigma$ are design parameters, and $\tau \in (0,1)$ and $\sigma \in [1, +\infty)$; and a sign function $\text{sgn}(x)$ is defined as follows:

$$\text{sgn}(x) = \begin{cases} 1, & x>0 \\ 0, & x=0 \\ -1, & x<0 \end{cases}; \text{ and} \quad (10)$$

(S35) substituting the nonlinear activation function into the formula (8) to obtain the MZND model for solving the node positioning in the UWSN, expressed as:

$$\dot{s}(t)=P^+(t)[\dot{z}(t)-\dot{P}(t)s(t)-\varphi L(P(t)s(t)-z(t))] \quad (11).$$

This application is focused on the AOA algorithm and the TDOA algorithm, and further in view of the time-varying characteristic of the node positioning in the UWSN, an efficient neural dynamics approach is adopted to realize the rapid and accurate positioning of the unknown node. In the node positioning method provided herein, a zeroing neural dynamics model with a nonlinear activation function is designed to solve the time-varying node positioning problem of the UWSN respectively based on AOA and TDOA. Theoretical analysis and computer simulation results demonstrate that the neural dynamics model has good convergence performance, and high accuracy and robustness under a dynamic environment.

The beneficial effects of the present disclosure are described below.

(1) The neural dynamics technology is applied to the field of UWSN. Specifically, a zeroing neural dynamics model is designed to effectively solve the node positioning problem of the UWSN.

(2) Due to the dynamic change of the underwater environment or the autonomous motion of the node, the node positioning in the UWSN is actually a time-varying problem. In view of this, a time parameter is introduced into modeling to obtain a mathematical model of the linear dynamic matrix equation.

(3) A modified zeroing neural dynamics model with a nonlinear activation function is proposed, and proved by strict mathematical analysis to have finite-time convergence. Simulation experiments show that the zeroing neural dynamics model has high positioning precision and mobile positioning robustness when solving the AOA-based and TDOA-based positioning problems.

DETAILED DESCRIPTION OF EMBODIMENTS

This application will be described in detail below with reference to the accompanying drawings and embodiments to facilitate the understanding. It should be noted that the embodiments are merely illustrative and are not intended to limit the present disclosure.

Figure 1:
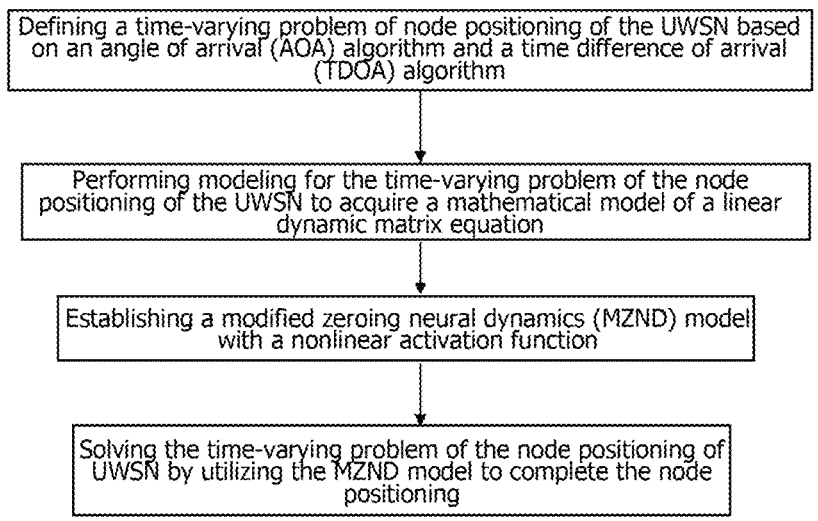
FIG. 1 is a flow chart of a node positioning method for an underwater wireless sensor network (UWSN) based on zeroing neural dynamics (ZND) according to an embodiment of this disclosure.

As shown in FIG. 1, a node positioning method for an underwater wireless sensor network (UWSN) based on zeroing neural dynamics (ZND) is illustrated, which includes the following steps.

(S1) A time-varying problem of node positioning in the UWSN is defined based on an angle of arrival (AOA) algorithm and a time difference of arrival (TDOA) algorithm.

(S2) Modeling is performed for the time-varying problem of the node positioning in the UWSN to acquire a mathematical model of a linear dynamic matrix equation.

(S3) A modified zeroing neural dynamics (MZND) model with a nonlinear activation function is established.

(S4) The time-varying problem of the node positioning in the UWSN is solved by utilizing the MZND model to complete node positioning of the UWSN.

With respect to the positioning algorithm, an AOA positioning algorithm in a two-dimensional (2D) scenario and a TDOA positioning algorithm in a three-dimensional (3D) scenario are described in this embodiment. A small local topology is used as a research range, where an unknown node is positioned with assistance of several anchor nodes. It should be noted that UWSN is generally considered to be in a 3D environment, but for nodes at the same depth, depth information can be temporarily ignored, and thus the UWSN can be processed in a 2D plane for simplification. Therefore, a 2D AOA positioning algorithm is discussed herein. Regardless of the 2D or 3D UWSN topological structure, the model provided in the embodiment is applicable.

In view of the AOA positioning algorithm, a position coordinate of an unknown node is obtained by an AOA of a communication signal at a receiving node, that is, an anchor node. A 2D scenario is observed where the position coordinate of the unknown node changes over time, and m anchor nodes are randomly arranged and have a fixed location, coordinates H of the m anchor nodes and position coordinate h(t) of the unknown node are respectively defined as follows:

$$H = \begin{bmatrix} x_1 & x_2 & \cdots & x_m \\ y_1 & y_2 & \cdots & y_m \end{bmatrix} \in \mathbb{R}^{2 \times m}, h(t) = \begin{bmatrix} x(t) \\ y(t) \end{bmatrix} \in \mathbb{R}^2.$$

According to geometric meaning of AOA, at any same moment, a tangent (tan) value of an AOA of each of the m anchor nodes and the unknown node is represented as:

$$\tan(\alpha_i(t)) = \frac{y(t) - y_i}{x(t) - x_i}; \quad (1)$$

where $i \in \{1, 2, \ldots, m\}$; $\alpha_i(t)$ denotes an arrival angle of a communication signal between the unknown node and an $i^{th}$ anchor node at moment t; and formula (1) is transformed into:

$$-\tan(\alpha_i(t))x(t)+y(t)=y_i-x_i\tan(\alpha_i(t)); \text{ and}$$

The time-varying problem of the node positioning in the UWSN based on the AOA in the 2D scenario is defined as:

$$\begin{bmatrix} -\tan(\alpha_1(t)) & 1 \\ -\tan(\alpha_2(t)) & 1 \\ \vdots & \vdots \\ -\tan(\alpha_m(t)) & 1 \end{bmatrix} \begin{bmatrix} x(t) \\ y(t) \end{bmatrix} = \begin{bmatrix} y_1 - x_1\tan(\alpha_1(t)) \\ y_2 - x_2\tan(\alpha_2(t)) \\ \vdots \\ y_m - x_m\tan(\alpha_m(t)) \end{bmatrix}. \quad (2)$$

In the TDOA positioning algorithm, the position of the unknown node is estimated by measuring the time difference of the communication signal sent by the unknown node to each anchor node. A 3D scenario is observed, where coordinates N of the m anchor nodes and position coordinate n(t) of the unknown node are respectively defined as follows:

$$N = \begin{bmatrix} x_1 & x_2 & \cdots & x_m \\ y_1 & y_2 & \cdots & y_m \\ z_1 & z_2 & \cdots & z_m \end{bmatrix} \in \mathbb{R}^{3 \times m}, n(t) = \begin{bmatrix} x(t) \\ y(t) \\ z(t) \end{bmatrix} \in \mathbb{R}^3.$$

According to physical meaning of TDOA, the following formulas are obtained:

$$r_i(t)=vT_i(t)=\sqrt{(x_i-x(t))^2+(y_i-y(t))^2+(z_i-z(t))^2};$$

$$\Delta T_{i1}(t)=T_i(t)-T_1(t); \text{ and}$$

$$r_{i1}(t)=v\Delta T_{i1}(t)=r_i(t)-r_1(t);$$

where $i \in \{1, 2, \ldots, m\}$; v represents a transmission velocity of the communication signal in a media; $T_i(t)$ represents time spent in transmitting the communication signal from the unknown node to the $i^{th}$ anchor node; $\Delta T_{i1}(t)$ represents different between $T_i(t)$ and time spent in transmitting the communication signal from the unknown node to a $1^{st}$ anchor node; $r_i(t)$ represents a distance between the unknown node and the $i^{th}$ anchor node; $r_i(t)$ represents different between $r_i(t)$ and a distance between the unknown node and the $1^{st}$ anchor node; and a derivation is performed for the time-varying problem of the node positioning in the UWSN based on the TDOA in the 3D scenario, and the derivation process is described as follows.

According to the definition of $r_i(t)$, $r_1^2(t)$ can be represented as follows:

$$r_i^2(t)=x_i^2+y_i^2+z_i^2-2x_ix(t)-2y_iy(t)-2z_iz(t)+x^2(t)+y^2(t)+z^2(t);$$

when $i=1$, $$r_1^2(t)=x_1^2+y_1^2+z_1^2-2x_1x(t)-2y_1y(t)-2z_1z(t)+x^2(t)+y^2(t)+z^2(t).$$

Let $Q_i=x_i^2+y_i^2+z_i^2$ and $r_i^2(t)$ and $r_1^2(t)$ can be respectively simplified into:

$$r_i^2(t)=Q_i-2x_ix(t)-2y_iy(t)-2z_iz(t)+x^2(t)+y^2(t)+z^2(t); \text{ and}$$

$$r_1^2(t)=Q_1-2x_1x(t)-2y_1y(t)-2z_1z(t)+x^2(t)+y^2(t)+z^2(t).$$

According to $r_{i1}(t)=r_i(t)-r_1(t)$, the above two formulas are subtracted, where the left is expressed as:

$$=r_i^2(t)-r_1^2(t)$$

$$=(r_i(t)-r_1(t))^2+2r_i(t)r_1(t)-2r_1^2(t); \text{ and}$$

$$=r_{i1}^2(t)+2r_1(t)(r_i(t)-r_1(t))$$

$$=r_{i1}^2(t)+2r_1(t)r_{i1}(t)$$

the right is expressed as:

$$=Q_i-Q_1-2x_{i1}x(t)-2y_{i1}y(t)-2z_{i1}z(t),$$

where $x_{i1}=x_i-x_1$, $y_{i1}=y_i-y_1$, $z_{i1}=z_i-z_1$; and the left and the right are combined to obtain:

$$x_{i1}x(t)+y_{i1}y(t)+z_{i1}z(t)+r_1(t)r_{i1}(t)=(Q_i-Q_1)/2-r_{i1}^2(t)/2=(Q_i-Q_1-r_{i1}^2(t))/2.$$

According to $r_{i1}(t)=v\Delta T_{i1}(t)$, the TDOA-based time-varying node positioning problem in the UWSN in the 3D mobile scenario can be defined as:

$$\begin{bmatrix} x_{21} & y_{21} & z_{21} & v\Delta T_{21}(t) \\ x_1 & y_{31} & z_{31} & v\Delta T_{31}(t) \\ \vdots & \vdots & \vdots & \vdots \\ x_{m1} & y_{m1} & z_{m1} & v\Delta T_{m1}(t) \end{bmatrix} \begin{bmatrix} x(t) \\ y(t) \\ z(t) \\ r_1(t) \end{bmatrix} = \begin{bmatrix} (Q_2-Q_1-(v\Delta T_{21}(t))^2)/2 \\ (Q_3-Q_1-(v\Delta T_{31}(t))^2)/2 \\ \vdots \\ (Q_m-Q_1-(v\Delta T_{m1}(t))^2)/2 \end{bmatrix}. \quad (3)$$

Based on formulas (2) and (3), the mathematical model of linear dynamic matrix is expressed as follows:

$$P(t)s(t)=z(t) \quad (4);$$

where $P(t) \in \mathbb{R}^{p \times q}$ is a known coefficient matrix and involves AOA and TDOA of the communication signal; $z(t) \in \mathbb{R}^p$ is a known vector; $s(t) \in \mathbb{R}^q$ (q=2 or 4) is an unknown vector and involves a position of the unknown node to be determined.

The traditional zeroing neural dynamics model is constructed through the following steps.

(S31) An error function is constructed, expressed as $$e(t)=P(t)s(t)-z(t).$$

(S32) To ensure that each element of the error function e(t) converges to zero, an evolution equation is defined, expressed as:

$$\dot{e}(t)=-\gamma F(e(t)),$$

where $\dot{e}(t)$ represents time derivative of e(t); $\gamma$ is a scaling factor, and $\gamma>0$; $F(\bullet): \mathbb{R}^p \to \mathbb{R}^p$ represents a linear activation function group, and each element in the linear activation function group is represented as $f(\bullet): \mathbb{R} \to \mathbb{R}$.

(S33) The error function e(t) is substituted into the evolution equation to obtain a traditional zeroing neural dynamics solution for solving the UWSN positioning problem (4), expressed as:

$$\dot{P}(t)s(t)+P(t)\dot{s}(t)-\dot{z}(t)=-\gamma F(P(t)s(t)-z(t))$$

Based on the traditional zeroing neural dynamics model, this embodiment further establishes the MZND model to solve the time-varying problem (4) of the node positioning of the UWSN, in which the error function is defined as $e(t)=P(t)s(t)-z(t) \in \mathbb{R}^p$, and the evolution equation is rewritten as:

$$\dot{e}(t)=-\varphi L(e(t)) \quad (5);$$

where $\varphi$ is a positive value, and is configured to control the convergence rate of the neural dynamic model; $L(\bullet): \mathbb{R}^p \to \mathbb{R}^p$ represents a monotonically increasing odd function group, and each element in the odd function group is represented as $\iota(\bullet): \mathbb{R} \to \mathbb{R}$, where $\iota(\bullet)$ is configured to make each item of the error function converges to zero within a finite period. In view of the actual network deployment scene, the time-varying problem (4) of the node positioning in the UWSN is mathematically positive definite or over definite. Therefore, the formula (5) is used to obtain a neural dynamics model for solving the time-varying problem of the node positioning in the UWSN under the positive definite situation, shown as:

$$\dot{s}(t)=P^+(t)[\dot{z}(t)-\dot{P}(t)s(t)-\varphi L(P(t)s(t)-z(t))] \quad (6);$$

where $P^+(t)$ represents an inverse matrix of the matrix P(t).

As for an over definite situation, where p>q, the error function is substituted into formula (5), and both sides of the formula (5) are multiplied by $P^T(t)$ to obtain the neural dynamics model, as shown in formula (7):

$$P^T(t)P(t)\dot{s}(t)=-\varphi P^T(t)L(P(t)s(t)-z(t))-P^T(t)\dot{P}(t)s(t)+P^T(t)\dot{z}(t). \quad (7)$$

If P(t) is full-rank, $P^+(t)P(t)$ is invertible and $P^+(t)=(P^T(t)P(t))^{-1}P^T(t)$; and formula (7) is rewritten into formula (8) for unifiedly representing the neural dynamics model for solving the time-varying problem of the node positioning in the UWSN, expressed as:

$$\dot{s}(t)=P^+(t)[\dot{z}(t)-\dot{P}(t)s(t)-\varphi L(P(t)s(t)-z(t))] \quad (8).$$

It is consistent for a neural dynamics model in a positive definite or over definite situation. Hence, a neural dynamics model used for solving the time-varying problem of the node positioning in the UWSN may be unifiedly expressed as formula (8). It can be seen from the above analysis that models (7) and (8) are equivalent in some cases.

Generally, an activation function represents a projection operation from one set to another set, and different activation functions generate different convergence properties. A zeroing neural dynamics model using a linear activation function tends to be time-consuming to reach a convergence effect. Therefore, based on the model (8), a zeroing neural dynamics model with a non-activation function is proposed to solve the time-varying problem (4) of the node positioning in the UWSN, and the convergence performance of the model is strictly theoretical.

As previously mentioned, the zeroing neural dynamics model using a linear activation function is limited in capabilities. A specially-designed nonlinear activation function is applied to the model (8), shown as:

$$\iota(x)=\kappa_1|x|^\tau \text{sgn}(x)+\kappa_2|x|^\sigma \text{sgn}(x) \quad (9);$$

where $\|$ represents an absolute value of a scalar; $\kappa_1$ and $\kappa_2$ are scaling factors, and $\kappa_1, \kappa_2>0$; $\tau$ and $\sigma$ are design parameters, and $\tau \in (0,1)$ and $\sigma \in [1, +\infty)$. The sign function is defined as follows:

$$\text{sgn}(x) = \begin{cases} 1, & x>0 \\ 0, & x=0 \\ -1, & x<0 \end{cases} \quad (10)$$

By substituting the activation function (9) into the formula (8), the MZND model for solving the time-varying problem (4) of the node positioning of the UWSN can be obtained, expressed as:

$$\dot{s}(t)=P^+(t)[\dot{z}(t)-\dot{P}(t)s(t)-\varphi L(P(t)s(t)-z(t))] \quad (11).$$

Convergence Analysis of the MZND Model

Theorem 1: a random approximate initial position s(0) is given, the real-time position of the motion of the unknown node estimated by the MZND model (11) can converge to a theoretical position s*(t) within a limited time C, and the limited time C is expressed as:

$$C \le \frac{|\varepsilon(0)|^{1-\tau}}{\varphi \kappa_1 (1-\tau)};$$

where $\varepsilon(0)$ is the element with the largest absolute value in the error function e(0).

The proof that s*(t) is a theoretical solution for an UWSN positioning problem based on AOA or TDOA is described below. It is started from a randomly generated initial value s(0), which is converged to s*(t) by the state vector s(t) generated by the MZND model within a limited time C. According to the definition of the error function, when the error function converges to 0, the s(t) converges to s*(t). Therefore, the error function e(t) can be discussed. In view of $\dot{e}(t)=-(\varphi L(e(t)))$, the i sub-system can be defined as:

$$\dot{e}_i(t)=-\varphi \iota(e_i(t))$$

Then, $\varepsilon(t)$ is defined as the element with a largest absolute value in the e(t), that is, at t moment, for all i(i=1, 2, ..., p), $|\varepsilon(t)| \ge |e_i(t)|$ is satisfied. According to the symbols of $\varepsilon(0)$, the verification process is discussed from the following three aspects.

When $\varepsilon(0)>0$, according to $|\varepsilon(t)| \ge |e_i(t)|$ it means that when $\varepsilon(t)$ reaches to 0, $e_i(t)$ is converged to zero. Provided that C is the convergence time of $\varepsilon(t)$, that is, the MZND model (11) converges to the theoretical solution at C moment. In addition, based on the definition of $\iota(x)$, C is calculated by the following formula:

$$\dot{\varepsilon}(t)=-\varphi(\kappa_1 \varepsilon^\tau(t)+\kappa_2 \varepsilon^\sigma(t));$$

where as $\kappa_2 \varepsilon^\sigma(t)>0$, the above formula can be simplified as:

$$\dot{\varepsilon}(t)<-\varphi \kappa_1 \varepsilon^\tau(t);$$

according to a differential concept, the above formula is further rewritten as:

$$dt < -\frac{1}{\varphi \kappa_1} \varepsilon^{-\tau}(t) d\varepsilon(t);$$

the both sides of the above formula are integrated to obtain:

$$\int_0^C dt < -\frac{1}{\varphi \kappa_1} \int_{\varepsilon(0)}^0 \varepsilon^{-\tau}(t) d\varepsilon(t); \text{ and}$$

the above definite integral is solved to obtain the convergence time:

$$C < \frac{(\varepsilon(0))^{1-\tau}}{\varphi \kappa_1 (1-\tau)} = \frac{|\varepsilon(0)|^{1-\tau}}{\varphi \kappa_1 (1-\tau)}.$$

When $\varepsilon(0)<0$, the convergence time is obtained by the similar conduction process, shown as:

$$C < \frac{(-\varepsilon(0))^{1-\tau}}{\varphi \kappa_1 (1-\tau)} = \frac{|\varepsilon(0)|^{1-\tau}}{\varphi \kappa_1 (1-\tau)}.$$

When $\varepsilon(0)=0$, the convergence time is obtained by the similar conduction process, shown as:

$$C = 0 = \frac{|\varepsilon(0)|^{1-\tau}}{\varphi \kappa_1 (1-\tau)}.$$

It can be seen from the above analysis that the MZND model converges to a theoretical solution in a limited time C when solving the positioning problem (4), that is, the position of the unknown node converges to a theoretical position within the limited time C.

Simulation Results of the MZND Model

Positioning simulation experiments are performed based on AOA and TDOA, and experimental results verify the effectiveness of the MZND model (11) in solving the UWSN positioning problem (4). The MZND model is then applied to the underwater sensor node positioning of the experimental bed to further illustrate the feasibility of the MZND model.

(1) UWSN Positioning Based on AOA

Figure 2A:
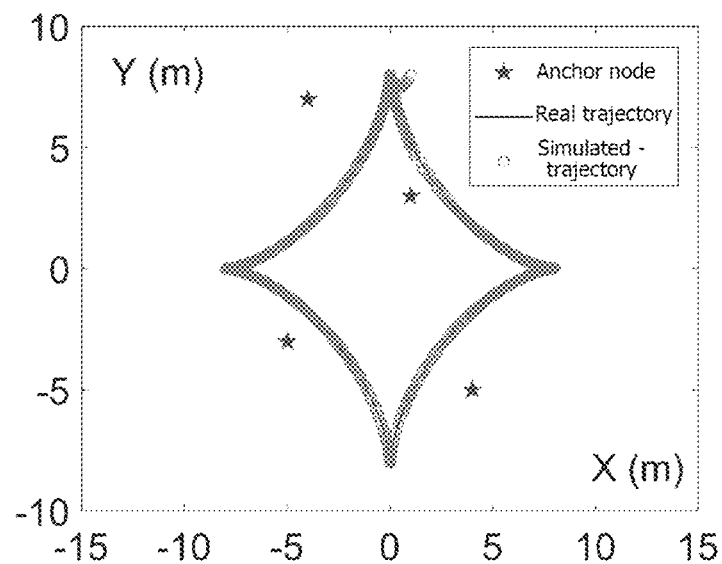
FIG. 2a is a topology design diagram of AOA-based node positioning experiment of the UWSN according to an embodiment of this disclosure.
Figure 2B:
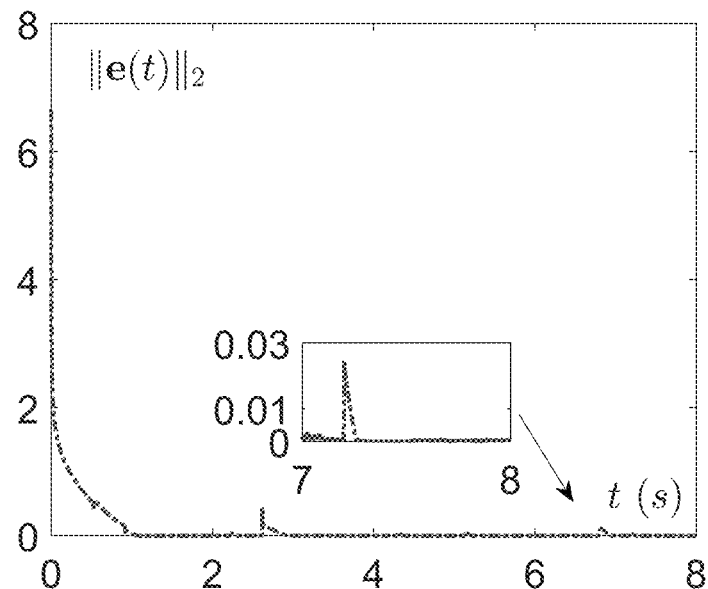
FIG. 2b schematically shows residual errors of the AOA-based node positioning experiment of the UWSN according to an embodiment of this disclosure.
Figure 2C:
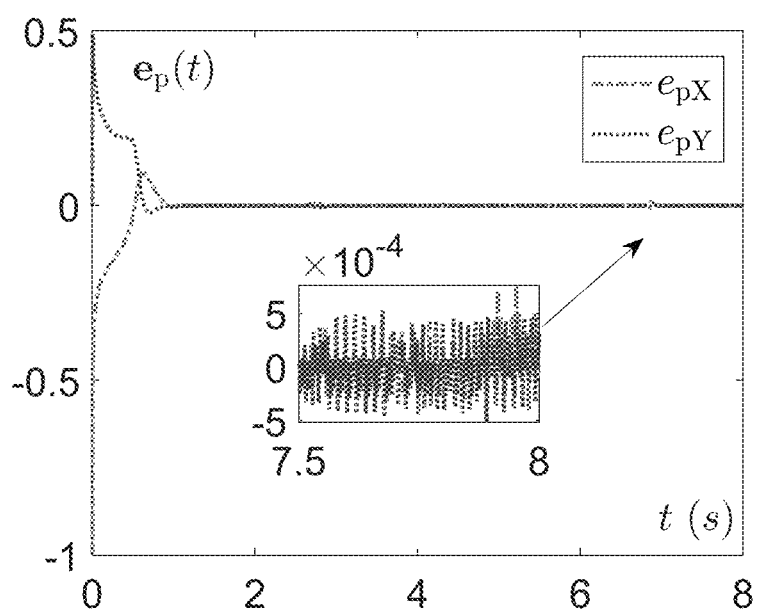
FIG. 2c schematically shows X and Y coordinate errors of the AOA-based node positioning experiment of the UWSN according to an embodiment of this disclosure.

A 2D UWSN scenario with a range of 30 m*20 m is simulated, where the unknown node moves along a diamond-shaped trajectory, and four anchor nodes therearound are randomly fixedly arranged. As shown in FIG. 2a, the blue pentagram represents an anchor node, the black solid line represents the true motion trajectory of the unknown node, the orange circle represents the motion trajectory of the unknown node estimated using the MZND model, and the two motion trajectories are almost coincident. FIG. 2b shows that the order of the residual error $\|e(t)\|_2$ of the MZND model (11) is $10^{-3}$. FIG. 2c describes the position estimation error $e_p(t)=[e_{pX}, e_{pY}, e_{pZ}]^T$, where the X-coordinate estimation error $e_{pX}$ and the Y-coordinate estimation error $e_{pY}$ converge to 0 within a short time. The positioning accuracy of the MZND model (11) proposed in this embodiment is sufficient for most UWSN applications.

(2) UWSN Positioning Based on TDOA

Figure 3A:
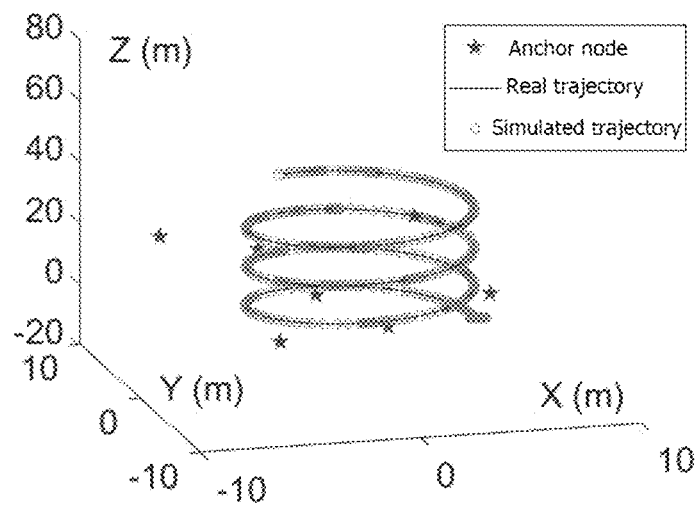
FIG. 3a is a topology design diagram of TDOA-based node positioning experiment of the UWSN according to an embodiment of this disclosure.
Figure 3B:
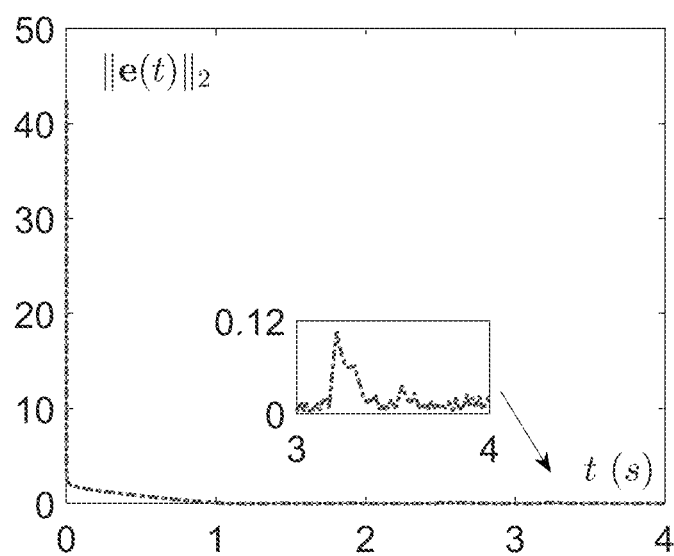
FIG. 3b schematically shows residual errors of the TDOA-based node positioning experiment of the UWSN according to an embodiment of this disclosure.
Figure 3C:
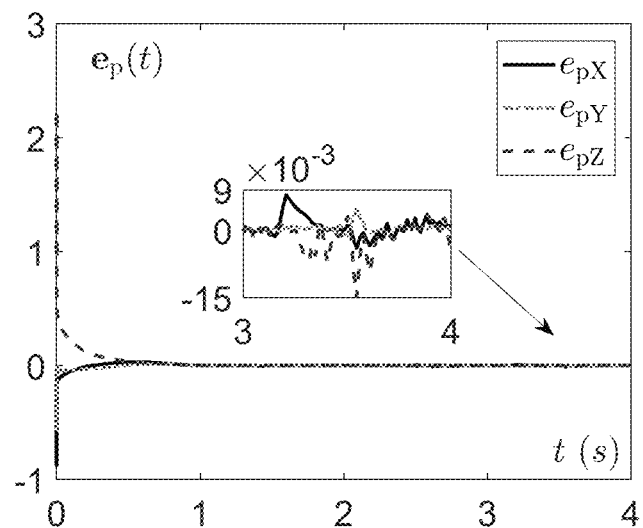
FIG. 3c schematically shows X and Y coordinate errors of the TDOA-based node positioning experiment of the UWSN according to an embodiment of this disclosure.

Positioning simulation experiments are performed based on TDOA, and experimental results generated by the MZND model are illustrated in FIGS. 3a-3c.

As shown in FIG. 3a, anchor nodes represented by blue pentagram are randomly and fixedly deployed in a 3D space with a range of 20 m*20 m*100 m. The unknown node moves in a spiral line along the positive direction of Z axis in the space, and the real motion trajectory of the unknown node is represented by a solid black line. The estimated motion trajectory of the unknown node generated by the MZND model is coincided with the real motion trajectory. As shown in FIG. 3b, the residual error generated by the MZND model converges to 0 within 2 s. As shown in FIG. 3c, when the MZND model converges, the order of position estimation errors $e_{pX}, e_{pY}, e_{pZ}$ are all $10^{-3}$. The effectiveness of the MZND model (11) in solving the time-varying problem of the node positioning of the UWSN based on TDOA is verified.

In summary, the MZND model (11) provided herein can correctly calculate the motion trajectory of the nodes when solving the time-varying problem of the node positioning in the UWSN based on TDOA, and has high accuracy and fast convergence performance.

(3) Application of UWSN Experimental Bed

Figure 4:
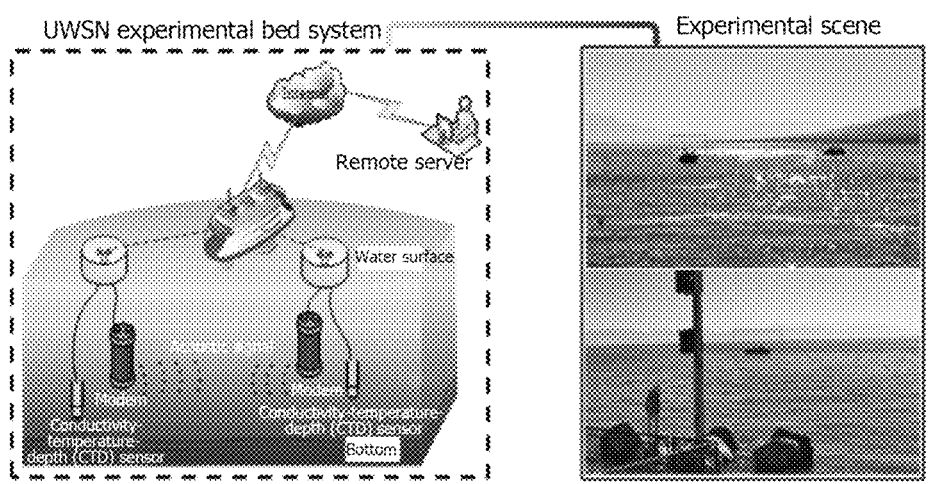
FIG. 4 schematically shows a UWSN experimental bed according to an embodiment of this disclosure.

In the past few years, an UWSN experimental bed integrated with Micro-ANP protocol stack has been built successfully (as shown in FIG. 4), and a large number of lake tests have been conducted in Qinghai Lake.

The positioning experiment based on AOA is carried out by using the geographic coordinates of the underwater sensor nodes deployed in the experimental bed. The experimental bed is mainly composed of an industrial router, sensor nodes, and a remote server. Each sensor node includes a C15 CTD sensor, an AquaSeNT OFDM modem, and a Raspberry PI development board. FIG. 4 shows the structure of the experimental bed and the experimental scene thereof. In this experiment, the depth of nodes is negligible, and the lake water flow speed is not considered.

Figure 5A:
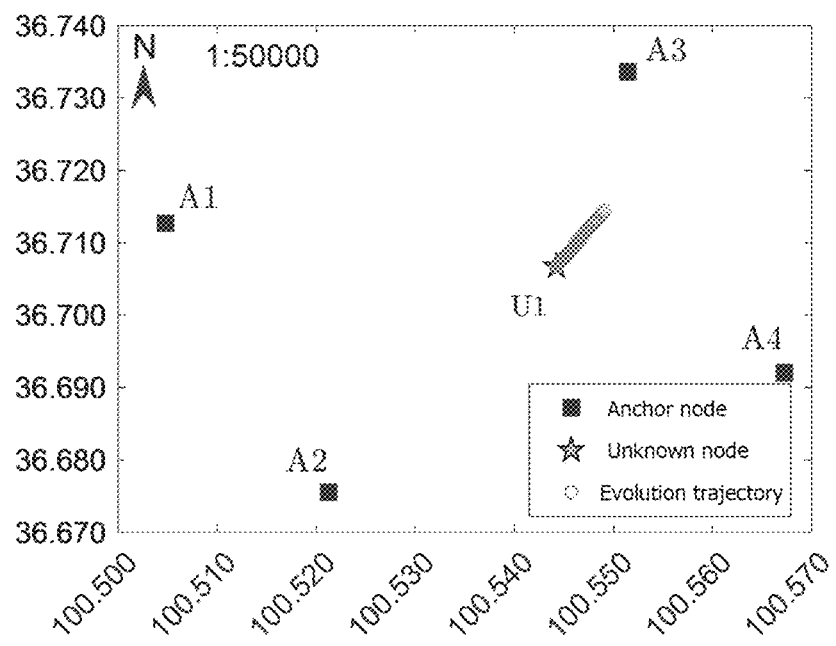
FIG. 5a is a topology design diagram of AOA-based underwater node positioning experiment of the UWSN according to an embodiment of this disclosure.
Figure 5B:
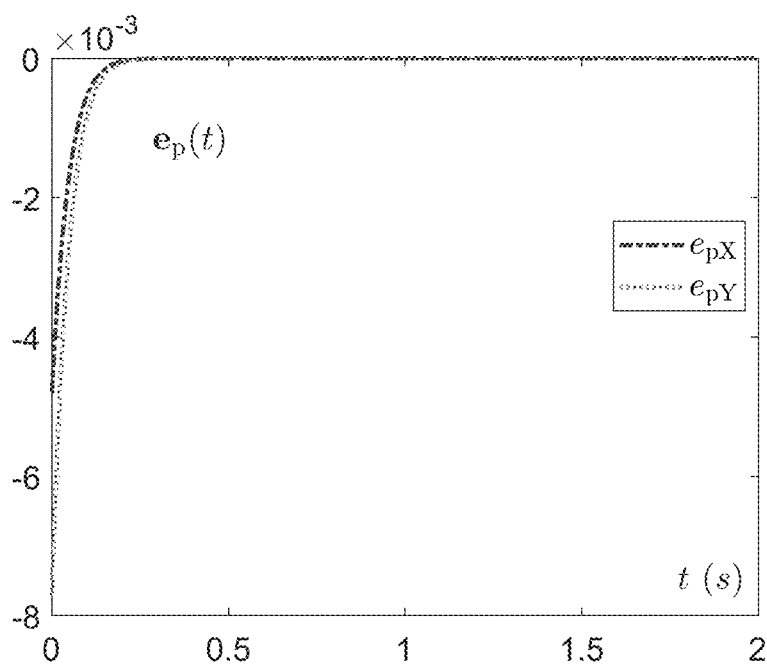
FIG. 5b schematically shows X and Y coordinate errors of the AOA-based underwater node positioning experiment of the UWSN according to an embodiment of this disclosure.

The experimental results of UWSN underwater node positioning based on AOA are shown in FIGS. 5a and 5b. In FIG. 5a, the unknown node $U_1$ is represented by a cyan pentagram, and the evolution trajectory of the MZND model is represented by a green circle. FIG. 5b shows the convergence of position estimation error $e_p(t)=[e_{pX}, e_{pY}]^T$. Nodes $A_1$, $A_2$, $A_3$, and $A_4$ are anchor nodes respectively equipped with a GPS module. The actual coordinate of position node $U_1$ is (36.706770, 100.544254). It can be seen from the experimental results shown in the FIG. 5a that the actual position of the unknown node $U_1$ is correctly calculated. Therefore, the MZND model (11) has potential applicability in solving the node positioning problem of UWSN experimental bed based on AOA.

The neural dynamic method is discussed and extended to the field of UWSN in this embodiment. With respect to the positioning problem of UWSN, a modified zeroing neural dynamics model is provided herein, and the convergence performance of the model is theoretically analyzed strictly. In the simulation part, the provided model is successfully applied to the UWSN node positioning problem based on AOA and TDOA, and the effectiveness of the model in terms of high accuracy and dynamic environment robustness is proved. Moreover, the potential applicability of the neural dynamics model in the real environment is illustrated by performing simulation experiments on the positioning of underwater sensor nodes in the UWSN experimental bed.

Described above are merely descriptive of the present disclosure, which are not intended to limit the present disclosure. Moreover, illustrated in the accompanying drawings are merely some embodiments of the present disclosure, which are not intended to limit the disclosure. Therefore, it should be understood that any modifications, changes and improvements made by one of ordinary skill in the art without departing from the spirit and scope of the disclosure shall fall within the scope of this application defined by the appended claims.

What is claimed is:

1. A node positioning method for an underwater wireless sensor network (UWSN) based on zeroing neural dynamics (ZND), comprising:
   (S1) defining a time-varying problem of node positioning in the UWSN based on an angle of arrival (AOA) algorithm and a time difference of arrival (TDOA) algorithm;
   (S2) performing modeling for the time-varying problem of the node positioning of the UWSN to acquire a mathematical model of a linear dynamic matrix equation;
   (S3) establishing a modified zeroing neural dynamics (MZND) model with a nonlinear activation function; and
   (S4) solving the time-varying problem of the node positioning of the UWSN by utilizing the MZND model to complete node positioning of the UWSN;
   in the AOA algorithm, a position coordinate of an unknown node is obtained by an AOA of a communication signal at a receiving node, wherein the receiving node is an anchor node; consider a two-dimensional (2D) scenario where the position coordinate of the unknown node changes over time, and m anchor nodes are randomly arranged and have a fixed location, coordinates H of the m anchor nodes and position coordinate h(t) of the unknown node are respectively defined as follows:

$$H = \begin{bmatrix} x_1 & x_2 & \cdots & x_m \\ y_1 & y_2 & \cdots & y_m \end{bmatrix} \in \mathbb{R}^{2 \times m}, h(t) = \begin{bmatrix} x(t) \\ y(t) \end{bmatrix} \in \mathbb{R}^2;$$

according to geometric meaning of AOA, a tangent (tan) value of an AOA of each of the m anchor nodes and the unknown node is represented as:

$$\tan(\alpha_i(t)) = \frac{y(t) - y_i}{x(t) - x_i}; \quad (1)$$

wherein $i \in \{1, 2, \ldots, m\}$; $\alpha_i(t)$ denotes an arrival angle of a communication signal between the unknown node and an $i^{th}$ anchor node at moment t; and formula (1) is transformed into:

$$-\tan(\alpha_i(t))x(t)+y(t)=y_i-x_i\tan(\alpha_i(t)); \text{ and}$$

the time-varying problem of the node positioning of the UWSN based on the AOA in the 2D scenario is defined as:

$$\begin{bmatrix} -\tan(\alpha_1(t)) & 1 \\ -\tan(\alpha_2(t)) & 1 \\ \vdots & \vdots \\ -\tan(\alpha_m(t)) & 1 \end{bmatrix} \begin{bmatrix} x(t) \\ y(t) \end{bmatrix} = \begin{bmatrix} y_1 - x_1\tan(\alpha_1(t)) \\ y_2 - x_2\tan(\alpha_2(t)) \\ \vdots \\ y_m - x_m\tan(\alpha_m(t)) \end{bmatrix}; \quad (2)$$

the TDOA algorithm is configured to measure time differences of communication signals originated from a source to the m anchor nodes to estimate the position coordinate of the unknown node; a 3D mobile scenario is observed, wherein coordinates N of the m anchor nodes and position coordinate n(t) of the unknown node are respectively defined as follows:

$$N = \begin{bmatrix} x_1 & x_2 & \cdots & x_m \\ y_1 & y_2 & \cdots & y_m \\ z_1 & z_2 & \cdots & z_m \end{bmatrix} \in \mathbb{R}^{3 \times m}, n(t) = \begin{bmatrix} x(t) \\ y(t) \\ z(t) \end{bmatrix} \in \mathbb{R}^3;$$

according to physical meaning of TDOA, the following formulas are obtained:

$$r_i(t)=vT_i(t)=\sqrt{(x_i-x(t))^2+(y_i-y(t))^2+(z_i-z(t))^2};$$

$$\Delta T_{i1}(t)=T_i(t)-T_1(t); \text{ and}$$

$$r_{i1}(t)=v\Delta T_{i1}(t)=r_i(t)-r_1(t);$$

wherein $i \in \{1, 2, \ldots, m\}$; v represents a transmission velocity of the communication signal in a media; $T_i(t)$ represents time spent in transmitting the communication signal from the unknown node to the $i^{th}$ anchor node; $\Delta T_{i1}(t)$ represents different between $T_i(t)$ and time spent in transmitting the communication signal from the unknown node to a $1^{st}$ anchor node; $r_i(t)$ represents a distance between the unknown node and the $i^{th}$ anchor node; $r_{i1}(t)$ represents different between $r_i(t)$ and a distance between the unknown node and the $1^{st}$ anchor node; and by derivation, the time-varying problem of the node positioning of the UWSN based on the TDOA in the 3D mobile scenario is defined as:

$$\begin{bmatrix} x_{21} & y_{21} & z_{21} & v\Delta T_{21}(t) \\ x_1 & y_{31} & z_{31} & v\Delta T_{31}(t) \\ \vdots & \vdots & \vdots & \vdots \\ x_{m1} & y_{m1} & z_{m1} & v\Delta T_{m1}(t) \end{bmatrix} \begin{bmatrix} x(t) \\ y(t) \\ z(t) \\ r_1(t) \end{bmatrix} = \begin{bmatrix} (Q_2 - Q_1 - (v\Delta T_{21}(t))^2)/2 \\ (Q_3 - Q_1 - (v\Delta T_{31}(t))^2)/2 \\ \vdots \\ (Q_m - Q_1 - (v\Delta T_{m1}(t))^2)/2 \end{bmatrix}; \quad (3)$$

Wherein, $Q_i = x_i^2 + y_i^2 + z_i^2$, $x_{i1} = x_i - x_1$, $y_{i1} = y_i - y_1$, $z_{i1} = z_i - z_1$.

2. The node positioning method of claim 1, wherein in step (S2), based on formulas (2) and (3), the mathematical model of the linear dynamic matrix equation is expressed as follows:

$$P(t)s(t) = z(t) \quad (4);$$

wherein $P(t) \in \mathbb{R}^{p \times q}$ is a known coefficient matrix and involves AOA and TDOA of the communication signal; $z(t) \in \mathbb{R}^p$ is a known vector; and $s(t) \in \mathbb{R}^q$ is an unknown vector and involves a position of the unknown node to be determined.

3. The node positioning method of claim 1, wherein in step (S3), the MZND model is constructed through steps of:

(S31) defining an error function, expressed as:

$$e(t) = P(t)s(t) - z(t) \in \mathbb{R}^p;$$

(S32) defining an evolution process as:

$$\dot{e}(t) = -\varphi L(e(t)) \quad (5);$$

where $\dot{e}(t)$ represents time derivative of $e(t)$, wherein $\varphi$ is a positive value, and is configured to control a convergence rate of a neural dynamic model; $L(\bullet): \mathbb{R}^p \to \mathbb{R}^p$ represents a monotonically increasing odd function group, and each element in the odd function group is represented as $\iota(\bullet): \mathbb{R} \to \mathbb{R}$, wherein $\iota(\bullet)$ is configured to make each item of the error function converge to zero within a finite period;

(S33) obtaining the neural dynamics model for solving the time-varying problem of the node positioning in the UWSN under a positive definite situation by using formula (5), shown as:

$$\dot{s}(t) = P^+(t)[\dot{z}(t) - \dot{P}(t)s(t) - \varphi L(P(t)s(t) - z(t))] \quad (6);$$

wherein $P^+(t)$ represents an inverse matrix of the matrix $P(t)$; as for an overdetermined situation, p>q, the error function is substituted into the formula (5), and both sides of the formula (5) are multiplied by $P^T(t)$ to obtain formula (7):

$$P^T(t)P(t)\dot{s}(t) = -\varphi P^T(t)L(P(t)s(t) - z(t)) - P^T(t)\dot{P}(t)s(t) + P^T(t)\dot{z}(t) \quad (7);$$

if $P(t)$ is full-rank, $P^+(t)P(t)$ is invertible and $P^+(t) = (P^T(t)P(t))^{-1}P^T(t)$; and formula (7) is rewritten into formula (8) for unifiedly representing the neural dynamics model for solving the time-varying problem of the node positioning of the UWSN, expressed as:

$$\dot{s}(t) = P^+(t)[\dot{z}(t) - \dot{P}(t)s(t) - \varphi L(P(t)s(t) - z(t))] \quad (8);$$

(S34) designing an nonlinear activation function, shown as:

$$\iota(x) = \kappa_1 |x|^\tau \text{sgn}(x) + \kappa_2 |x|^\sigma \text{sgn}(x) \quad (9);$$

wherein $\|$ represents an absolute value of a scalar; $\kappa_1$ and $\kappa_2$ are scaling factors, and $\kappa_1, \kappa_2 > 0$; $\tau$ and $\sigma$ are design parameters, and $\tau \in (0,1)$ and $\sigma \in [1, +\infty)$; and a sign function $\text{sgn}(x)$ is defined as follows:

$$\text{sgn}(x) = \begin{cases} 1, & x > 0 \\ 0, & x = 0 \\ -1, & x < 0 \end{cases} \text{; and} \quad (10)$$

(S35) substituting the nonlinear activation function into the formula (8) to obtain the MZND model for solving the node positioning of the UWSN $$\dot{s}(t) = P^+(t)[\dot{z}(t) - \dot{P}(t)s(t) - \varphi L(P(t)s(t) - z(t))].$$

* * * * *